US012780316B2

(12) United States Patent
Favaretto

(10) Patent No.: US 12,780,316 B2
(45) Date of Patent: Nov. 3, 2026

(54) CAR WITH UNDER-DOOR SIDE MEMBERS

(71) Applicant: FERRARI S.P.A., Modena (IT)

(72) Inventor: Fabrizio Favaretto, Modena (IT)

(73) Assignee: FERRARI S.P.A., Modena (MO) (IT)

( * ) Notice: Subject to any disclaimer, the term of this patent is extended or adjusted under 35 U.S.C. 154(b) by 308 days.

(21) Appl. No.: 18/614,073

(22) Filed: Mar. 22, 2024

(65) Prior Publication Data

US 2024/0326915 A1 Oct. 3, 2024

(30) Foreign Application Priority Data

Mar. 28, 2023 (IT) ........................ 102023000005904

(51) Int. Cl.
*B62D 21/02* (2006.01)

(52) U.S. Cl.
CPC .................................... *B62D 21/02* (2013.01)

(58) Field of Classification Search
CPC ........... B60R 3/00; B60R 3/002; B60R 3/005; B60R 3/007; B60R 3/02
See application file for complete search history.

(56) References Cited

U.S. PATENT DOCUMENTS

| | | | | |
|---|---|---|---|---|
| 1,654,033 A * | 12/1927 | Bishop | B60R 9/02 224/29.5 |
| 10,518,727 B1 * | 12/2019 | Barbuta | B60R 19/42 |
| 10,814,790 B2 * | 10/2020 | Meszaros | B60R 3/02 |
| 2017/0253271 A1 | 9/2017 | Bertezzolo | |
| 2020/0062183 A1 * | 2/2020 | Smith | B60R 16/03 |
| 2022/0306002 A1 * | 9/2022 | Chung | B60R 3/002 |

FOREIGN PATENT DOCUMENTS

| | | |
|---|---|---|
| CN | 111688819 A | 9/2020 |
| FR | 3110517 A1 | 11/2021 |
| KR | 100228094 B1 | 11/1999 |

OTHER PUBLICATIONS

Italian Search Report in IT Application No. 202300005904 mailed Oct. 27, 2023, an English Translation attached hereto (6 pages).

* cited by examiner

*Primary Examiner* — Yanick A Akaragwe
(74) *Attorney, Agent, or Firm* — Leason Ellis LLP

(57) ABSTRACT

A car has a passenger compartment, two access doors to access the passenger compartment, and a support frame, which defines a lower floor of the car, and is provided with two under-door side members, each mounted under a relative access door and defined by a section bar with an elongated shape which is longitudinally delimited by two end faces and is laterally delimited by an outer surface, and has at least one longitudinal recess, which opens outwards in the area of the outer surface and houses, on the inside, at least one electrical wiring and/or at least one supply duct for an operating fluid.

9 Claims, 3 Drawing Sheets

CAR WITH UNDER-DOOR SIDE MEMBERS

CROSS-REFERENCE TO RELATED APPLICATIONS

This patent application claims priority from Italian patent application no. 102023000005904 filed on Mar. 28, 2023, the entire disclosure of which is incorporated herein by reference.

TECHNICAL FIELD

The present invention relates to a car.

BACKGROUND

In particular, the present invention relates to a car of the type comprising a support frame defining at least part of a lower floor of the car; a passenger compartment mounted on the support frame and protruding upwards from the lower floor; and a power engine for moving the car.

The passenger compartment is provided with two access doors associated with respective under-door side members, which are commonly known by the term "sills", and define part of the support frame of the car.

Each under-door side member extends under a relative access door, and is defined by a tubular section bar with an elongated shape normally having a quadrilateral, in particular square or rectangular, cross-section.

The car further comprises a plurality of electrical wirings and a plurality of supply ducts of operating fluids mounted inside the passenger compartment.

The known cars of the type described above have some drawbacks mainly deriving from the fact that the electrical wirings and the supply ducts are either mounted on the outside of, and along, the under-door side members thus reducing the space available inside the passenger compartment or are mounted on the inside of, and along, the under-door side members thus requiring relatively long and complex interventions by the qualified personnel.

SUMMARY

The object of the present invention is to provide a car which is exempt from the drawbacks described above and which is simple and cost-effective to manufacture.

According to the present invention, a car is provided as claimed in the appended claims.

BRIEF DESCRIPTION OF THE DRAWINGS

The present invention will now be described with reference to the accompanying drawings, which illustrate a non-limiting example embodiment thereof, wherein.

DESCRIPTION OF EMBODIMENTS

Figure 1:
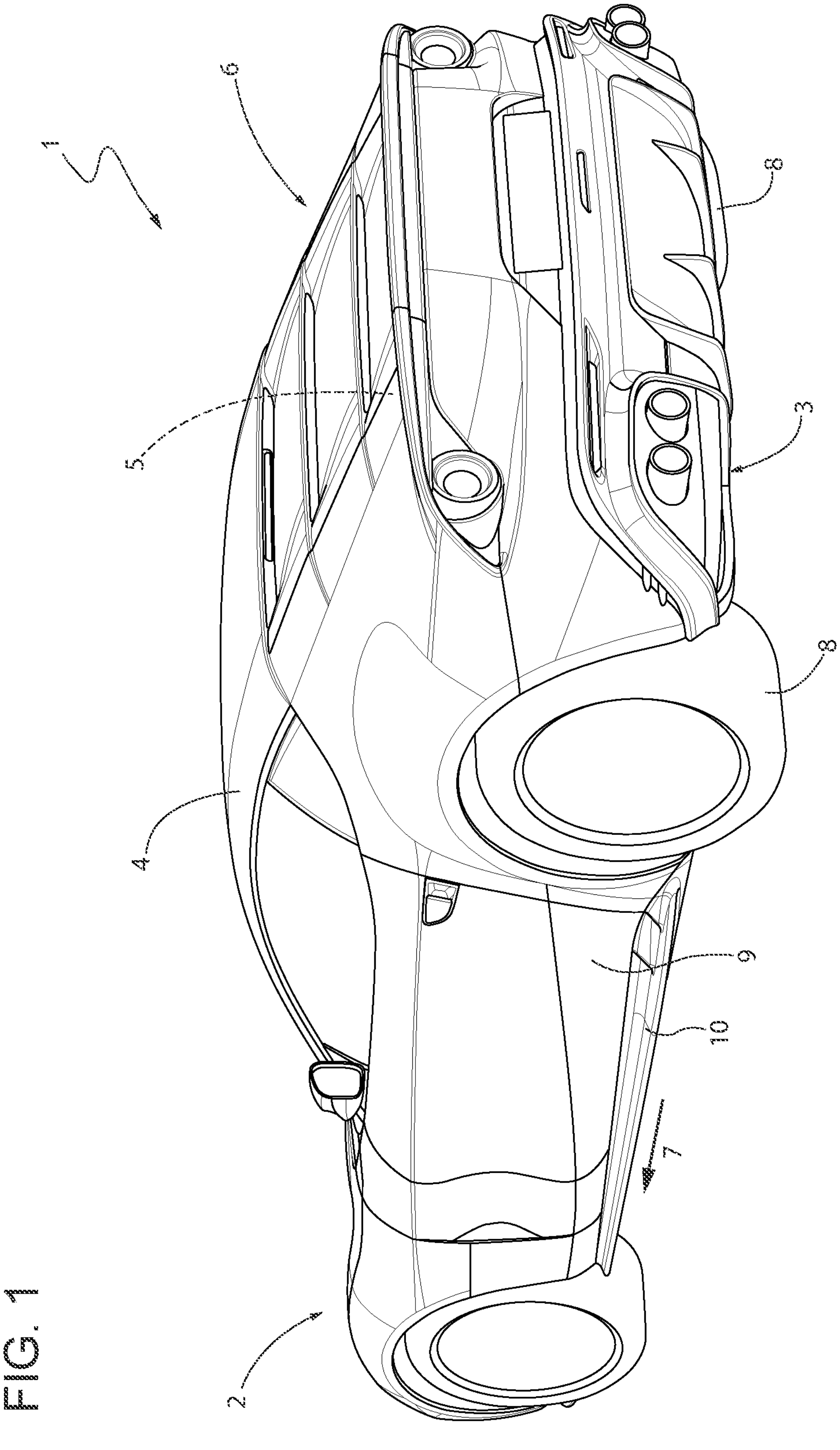
FIG. 1 is a schematic perspective view, with parts removed for clarity, of a preferred embodiment of the car of the present invention.
Figure 2:
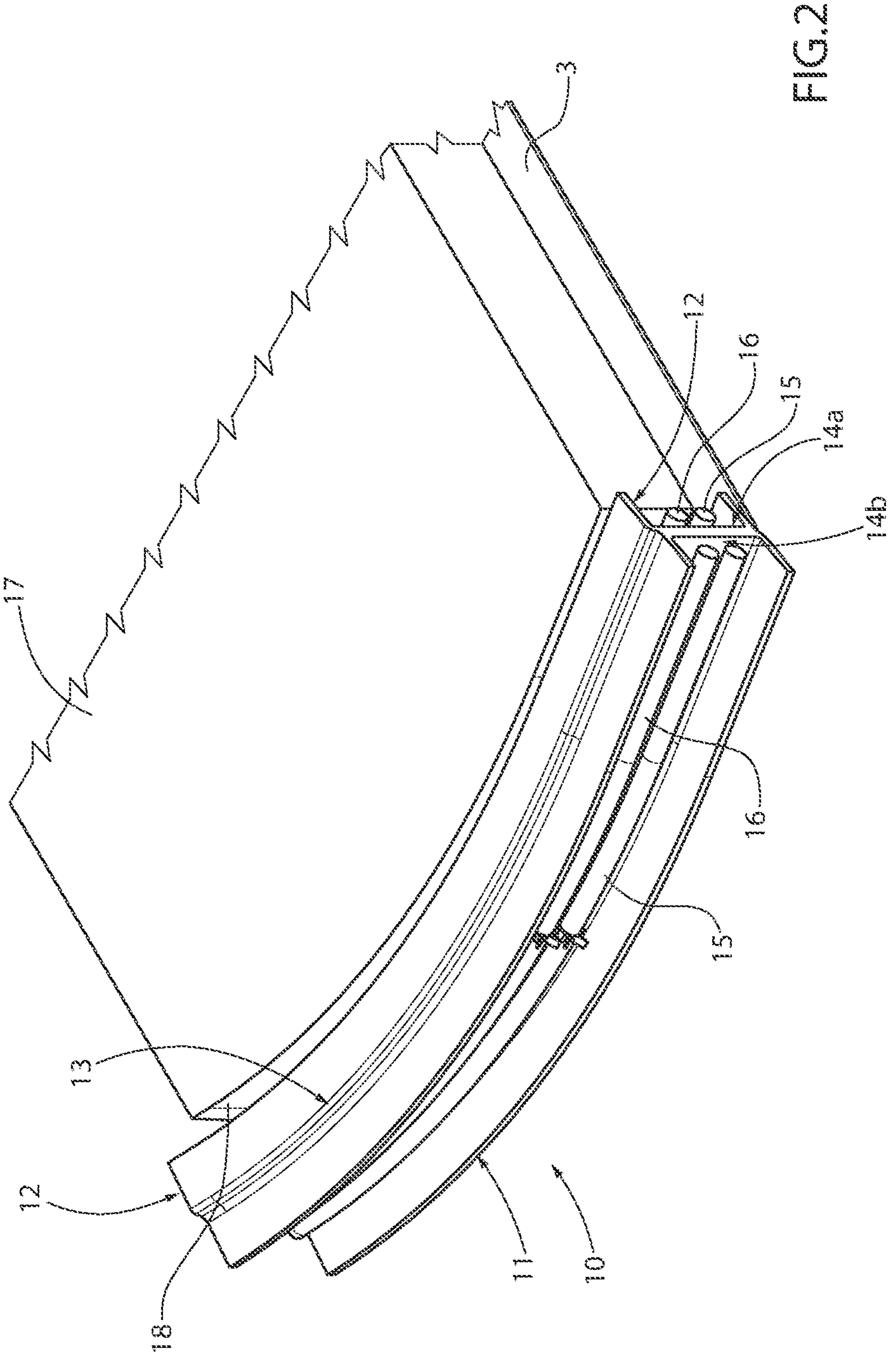
FIG. 2 is a schematic perspective view, with parts removed for clarity, of a detail of the car of FIG. 1.

With reference to FIGS. 1 and 2, reference number 1 indicates, as a whole, a car, in particular a sports car, comprising a support frame 2 defining at least part of a lower floor 3 of the car 1, and a passenger compartment 4 mounted on the frame 2 and protruding upwards from the floor 3.

The car 1 further comprises a power engine 5 of known type, which is mounted in the centre of a rear zone 6 of the frame 2, in particular parallel to a travel direction 7 of the car 1, and is connected in a known manner to two rear driving wheels 8 of the car 1.

The passenger compartment 4 is provided with two access doors 9, each of which extends above an under-door side member 10 with an elongated shape defining part of the frame 2.

The side member 10 comprises a metal section bar 11, which is longitudinally delimited by two end faces 12, and is further laterally delimited by an outer surface 13.

The side member 10 is provided with at least one longitudinal recess 14, which opens outwards in the area of the surface 13 for housing, on the inside, at least one electrical wiring 15 and/or at least one supply duct 16 for an operating fluid, for example for an air-conditioning system, for a braking system, for a cooling system of the car 1.

In this case:

- the recesses 14 further open outwards in the area of the faces 12;
- the side member 10 is provided with two longitudinal recesses 14, of which one (in the following indicated by 14*a*) faces the recess 14*a* of the other side member 14 and the other one (in the following indicated by 14*b*) is opposite the recess 14*a;*
- the side member 10 has a curved shape with a concavity facing the other side member 10; and
- the section bar 11 of each side member 10 is an H-shaped IPE beam.

The car 1 further comprises a power supply battery 17, which is fixed to the floor 3, and is thus rigidly connected to the side members 10 for guaranteeing a relatively high torsional stiffness to the assembly defined by the side members 10 and by the battery 17.

The battery 17 is delimited, in this case, by two curved side faces 18, which face the corresponding side members 10, and have a bending that is complementary to the bending of the side members 10.

Figure 3:
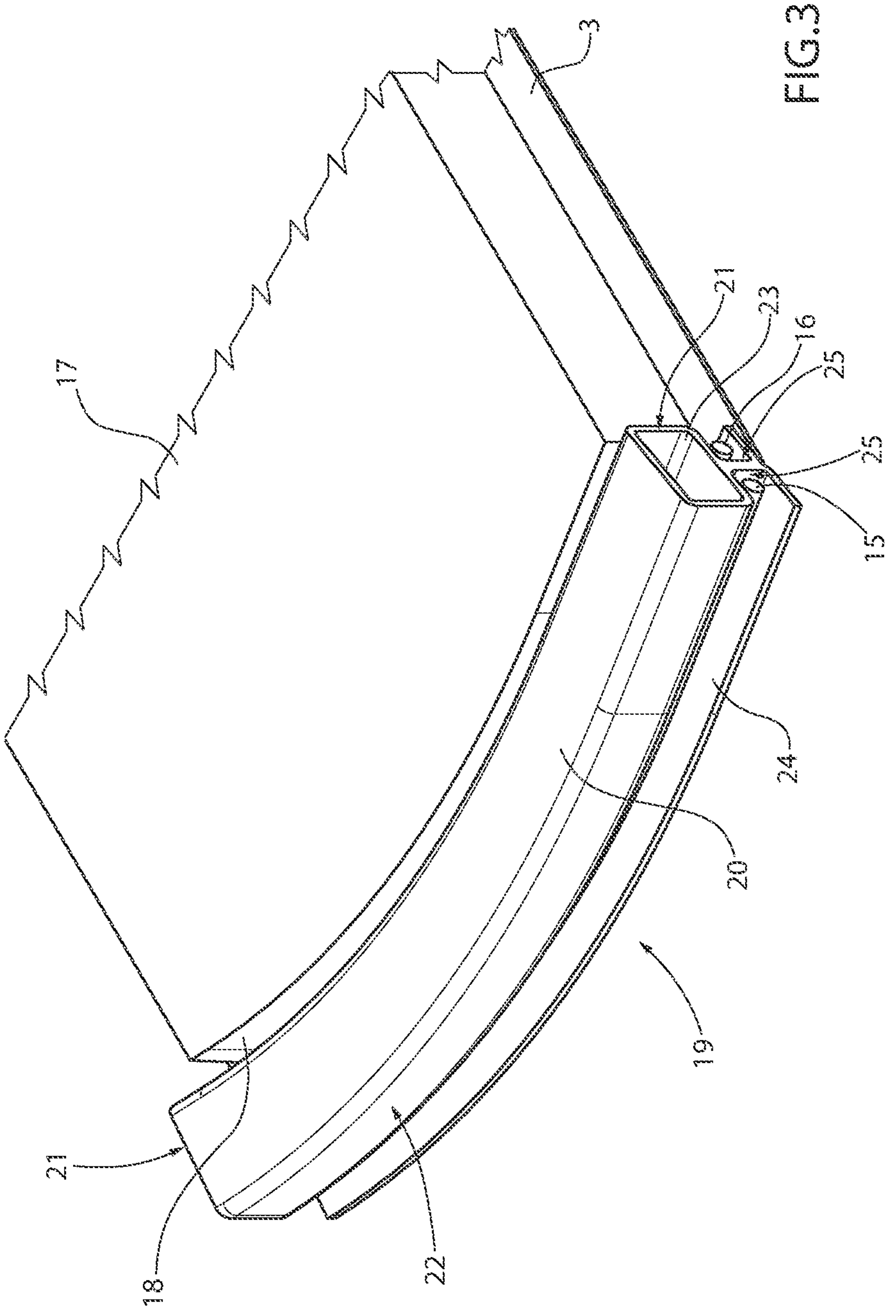
FIG. 3 is a schematic perspective view, with parts removed for clarity, of a variation of the detail of FIG. 2.

The variation illustrated in FIG. 3 differs from what is illustrated in the previous figures for the sole fact that, in said variation, each side member 10 is eliminated and replaced by a side member 19 comprising a metal section bar 20, which is longitudinally delimited by two end faces 21, and is further laterally delimited by an outer surface 22.

The side member 19 comprises a first portion 23 having a quadrilateral cross-section, and a T-shaped second portion 24 protruding downwards from the portion 23.

The portion 24 defines two longitudinal recesses 25, which open outwards in the area of the surface 22 for housing, on the inside, at least one electrical wiring 15 and/or at least one supply duct 16 for an operating fluid.

In this case:

- the recesses 25 further open outwards in the area of the faces 21; and
- the side member 19 has a curved shape with a concavity facing the other side member 19.

Since the longitudinal recesses 14, 25 are open outwards in the area of the outer surfaces 13, 22 of the respective section bars 11, 20, the electrical wirings 15 and the supply ducts 16 are housed inside the recesses 14, 25 in a relatively simple manner and without occupying further space inside the passenger compartment 4.

The invention claimed is:

1. A car comprising a passenger compartment; two access doors to access the passenger compartment; and a support frame, which defines a lower floor of the car and comprises, in turn, two under-door side members, each mounted under a relative access door and comprising a section bar with an elongated shape, which is longitudinally delimited by two end faces and is laterally delimited by an outer surface; and characterized in that at least one under-door side member comprises at least one longitudinal recess, which opens outwards in the area of said outer surface and houses, on the inside, at least one electrical wiring and/or at least one supply duct for an operating fluid;

wherein each longitudinal recess extends between the end faces of the section bar of the relative under-door side member.

2. The car according to claim 1, wherein each under-door side member comprises at least one longitudinal recess.

3. The car according to claim 1, wherein the section bar of each under-door side member has the shape of an IPE beam.

4. The car according to claim 1, wherein each first longitudinal recess has a depth that is such as to house, on the inside, the at least one electrical wiring and/or the at least one supply duct for the operating fluid.

5. A car comprising a passenger compartment; two access doors to access the passenger compartment; and a support frame, which defines a lower floor of the car and comprises, in turn, two under-door side members, each mounted under a relative access door and comprising a section bar with an elongated shape, which is longitudinally delimited by two end faces and is laterally delimited by an outer surface; wherein each under-door side member comprises a first longitudinal recess, which opens outwards in the area of said outer surface and houses, on the inside, at least one electrical wiring and/or at least one supply duct for an operating fluid;

wherein the first longitudinal recess of one under-door side member faces the first longitudinal recess of the other under-door side member.

6. The car according to claim 5, wherein each under-door side member comprises a second longitudinal recess opposite the relative first longitudinal recess.

7. A car comprising a passenger compartment; two access doors to access the passenger compartment; and a support frame, which defines a lower floor of the car and comprises, in turn, two under-door side members, each mounted under a relative access door and comprising a section bar with an elongated shape, which is longitudinally delimited by two end faces and is laterally delimited by an outer surface; and characterized in that at least one under-door side member comprises at least one longitudinal recess, which opens outwards in the area of said outer surface and houses, on the inside, at least one electrical wiring and/or at least one supply duct for an operating fluid; and a power supply battery mounted between the two under-door side members.

8. The car according to claim 7, wherein the power supply battery and the under-door side members are rigidly connected to one another.

9. The car according to claim 7, wherein each under-door side member has a curved shape with a concavity facing the other under-door side member and the power supply battery is delimited by two side faces facing the under-door side members and having a bending that is complementary to the bending of the under-door side members.

* * * * *